UNITED STATES PATENT OFFICE 2,474,194

N-HETEROCYCLIC SUBSTITUTED GUANAMINES

Jack Theo Thurston, Cos Cob, Conn., assignor to American Cyanamid Company, New York, N. Y., a corporation of Maine No Drawing. Application August 30, 1941, Serial No. 409,153

1 Claim. (Cl. 260—249.5)

This invention relates to N-Heterocyclic guanamines.

Guanamines of the present invention may be represented by the formula:

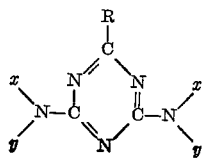

where R is hydrogen, alkyl, aryl or heterocyclic, $x$ is a heterocyclic group, and $y$ is hydrogen, alkyl, aryl or heterocyclic. Guanamines produced according to the present invention are capable of reacting with formaldehyde to yield resins which in some cases are thermoplastic and in others thermosetting. The guanamines can also be used for the manufacture of drugs, corrosion inhibitors, and the like.

The present invention is not limited to any particular method of preparing the guanamines. Two methods, however, appear to give the best results. In the first, an N-heterocyclic substituted biguanide is condensed with an ester of a carboxylic acid if desired in the presence of a condensing agent such as a metal alkoxide. The second method consists of fusing the unsubstituted guanamines with a salt of the desired heterocyclic amine. The reaction is preferably effected in the presence of a solvent which makes the mix more fluid and reduces losses due to sublimation when reflux equipment is used. Various fluxes may be used but phenol is cheap and efficient and is a preferred material. Amine salts such as the following may be used in the fusion reaction to produce the N-heterocyclic substituted guanamines; heterocyclic amines, 2-aminoquinoline (also 4, 5, or 6-aminoquinoline), 3-aminocarbazole, 2-aminoacridine, 5-amino-3-methylisoxazole, 2-amino-4,5-benzo-1,3-thiazine, 2-aminophenylthiazine, furfurylamine, difurfurylamine, 3-amino-5-methyl-1,2,4-triazole, and aminoacetoguanamine.

When reaction with an ester is employed it is preferable to carry out the reaction in a solvent. Among the most effective solvents are the lower monohydric aliphatic alcohols, such as methanol, ethanol, the ethyl ether of ethylene glycol, and the like. Where the alcohol corresponds to the alcohol radical of the ester used in the reaction the additional advantages obtained is that no separation problem results.

The invention will be described in greater detail in conjunction with the following specific examples. The parts are by weight.

EXAMPLE 1

4-N-2'-(4'-methyl)-thiazolyl hexanoguanamine

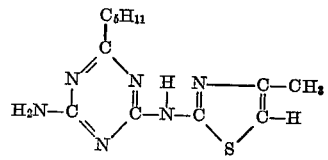

54.3 parts of hexanoguanamine, which can be prepared by reaction of biguanide with an ester of caproic acid, 43.2 parts of 2-amino-4-methyl thiazole hydrochloride and 20 parts of phenol were heated together at 180° C. for about 6 hours. The melt was allowed to cool, diluted with water, made alkaline with concentrated sodium hydroxide solution, thoroughly triturated, filtered, washed thoroughly with water, and allowed to dry. The guanamine was then recrystallized twice from the ethyl ether of ethylene glycol, yielding light tan needles which melted at 231–232° C.

EXAMPLE 2

4-N-2'-pyridyl formoguanamine

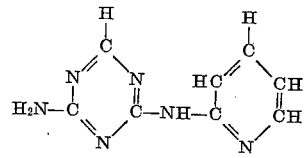

Twenty-five parts of α-pyridylbiguanide neutral sulfate were added to a solution of 6.1 parts of sodium methylate in 100 parts of methanol. After stirring at room temperature for two hours, the mixture was refluxed for fifteen minutes, the sodium sulfate was removed by filtration, and after cooling to room temperature 9 parts of methyl formate were added. After standing for about two hours, the guanamine precipitated from solution, and after filtration it was dissolved in hydrochloric acid, and reprecipitated with dilute ammonium hydroxide. The product melted at 273–274° C.

I claim:

4-N-2'-pyridyl formoguanamine.

JACK THEO THURSTON.

(References on following page)

REFERENCES CITED

The following references are of record in the file of this patent:

UNITED STATES PATENTS

| Number | Name | Date |
|---|---|---|
| 1,994,602 | Wieners | Mar. 19, 1935 |
| 2,192,127 | Ebel | Feb. 27, 1940 |
| 2,217,030 | Simons | Oct. 8, 1940 |
| 2,221,361 | Schmid | Nov. 12, 1940 |
| 2,270,478 | Schmid | Jan. 20, 1942 |

FOREIGN PATENTS

| Number | Country | Date |
|---|---|---|
| 106,398 | Switzerland | 1924 |
| 466,096 | Great Britain | 1937 |
| 486,519 | Great Britain | 1938 |
| 486,577 | Great Britain | 1938 |

OTHER REFERENCES

Berichte der Deu. Chem., 25, pp. 528, 532, 533.